United States Patent

[11] 3,590,260

| [72] | Inventors | Peter Holmes;<br>Jacques Pettavel, both of Geneva, Switzerland |
|---|---|---|
| [21] | Appl. No | 640,212 |
| [22] | Filed | May 22, 1967 |
| [45] | Patented | June 29, 1971 |
| [73] | Assignee | Societe Genevoise D'Instruments De Physique<br>Geneva, Switzerland |
| [32] | Priority | Aug. 25, 1966 |
| [33] | | Switzerland |
| [31] | | 12,343/66 |

[54] HIGH-PRECISION READING DEVICE OF THE GRADUATION OF A PRECISION RULER
4 Claims, 6 Drawing Figs.

[52] U.S. Cl. ............................................. 250/231, 356/138
[51] Int. Cl. ....................................... G01d 5/34, G01d 5/36, G01d 11/10
[50] Field of Search ............................................. 250/231

[56] References Cited
UNITED STATES PATENTS

| 2,376,235 | 5/1945 | Castro | 250/206 X |
|---|---|---|---|
| 3,042,804 | 7/1962 | Koulikovitch | 250/206 |
| 3,252,674 | 5/1966 | Magnus | 250/206 X |
| 2,818,172 | 12/1957 | Mills | 250/231 X |
| 2,880,512 | 4/1959 | Fenemore et al. | 250/231 X |
| 3,116,886 | 1/1964 | Kuehne | 250/231 X |
| 3,167,605 | 1/1965 | Heidenhain | 250/231 X |
| 3,305,691 | 2/1967 | Hock | 250/231 X |

FOREIGN PATENTS

| 353,904 | 6/1961 | Switzerland | x250/231 |
| 686,274 | 1/1953 | Great Britain | 250/231 |

Primary Examiner—Robert Segal
Attorney—Young & Thompson

ABSTRACT: A device for reading the graduations of rulers with high precision, including a photoelectric microscope having an optical sighting device, in which the measuring field on either side of a fixed centered position is periodically scanned and a photoelectric cell receives rays from the scanned surface of the ruler and delivers a train of optical pulses. In the focal plane of the ruler and on the optical path of the microscope, a cylindrical diaphragm is disposed which has a helical slot movable between plural positions corresponding to portions of the measuring field centered on different scale markings of the ruler.

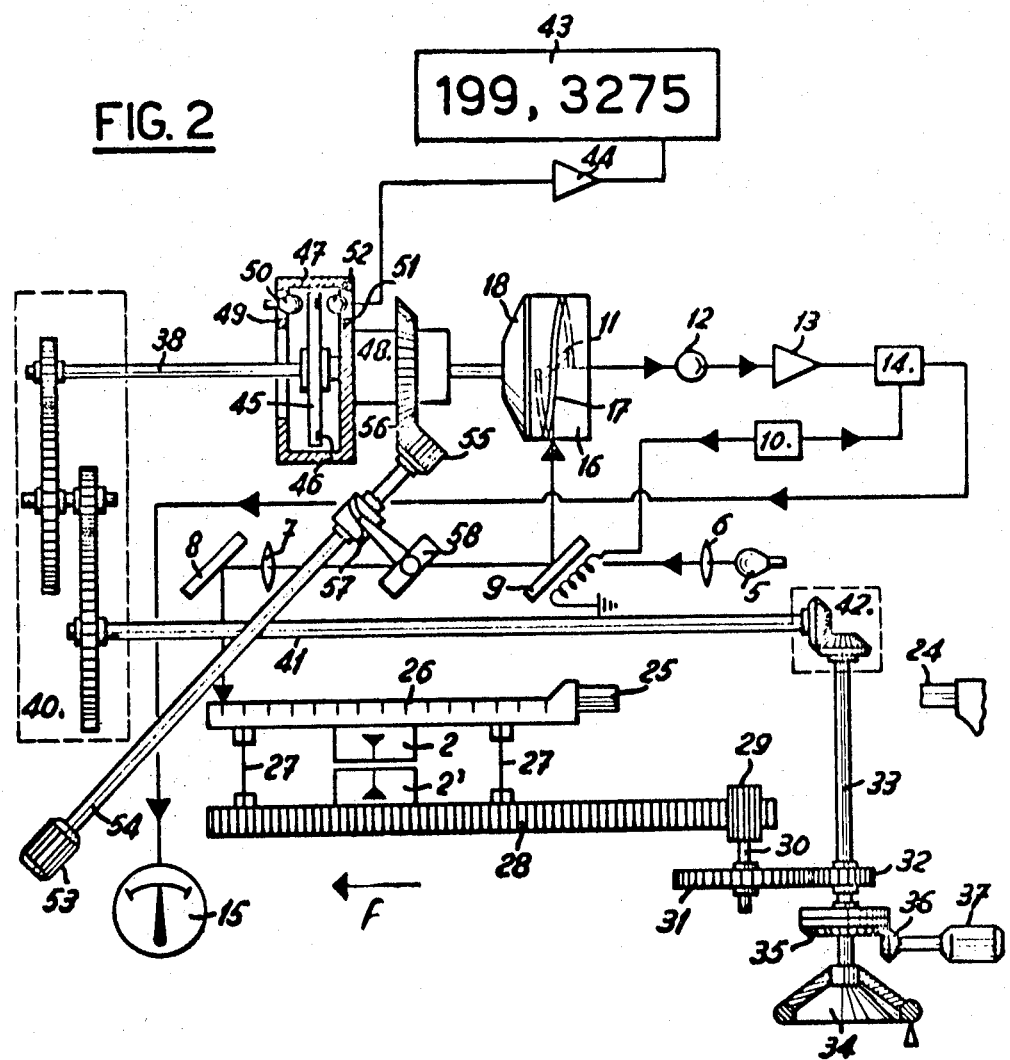

HIGH-PRECISION READING DEVICE OF THE GRADUATION OF A PRECISION RULER

The present invention has for its object a high-precision reading device of the graduation of a precision ruler, comprising a photoelectric microscope, means enabling a periodical scanning of the measuring field, on either side of a stationary centered position, as well as a photoelectric cell receiving the reflected rays by—or transmitted through—the surface of the precision ruler.

Such high-precision reading devices are known and described for example in the British Pat. No. 686,274 and are satisfactory when used as zero reading devices, that is to say enabling to determine with precision the coincidence of a movable member with a predetermined position.

However, when it is desired to follow up the displacement of a movable member in reading at each moment its successive positions, one has to resort either to complex devices of the type described in the U.S. Pat. No. 3,042,804 and which permit a restricted area of displacement only, or to devices in which the photoelectric microscope is mounted on a carriage which is able to displace itself parally to the movable member over a distance at least equal to the interval comprised between two strokes of the graduation of a ruler.

These last devices enable theoretically to follow up a movable member in its displacement; it suffices in fact to displace the photoelectric microscope conjointly with the movable member to be followed, over a distance at least equal to that separating two strokes of the ruler, then to replace rapidly the photoelectric microscope in its starting position for which it sights the following stroke of the ruler. These fast return strokes of the photoelectric microscope raise problems which are practically not to be solved as soon as the speed of displacement of the movable member is appreciable.

The present invention has for its object a high-precision reading device of the graduation of a precision ruler tending to remedy the precited drawbacks. This reading device comprises a photoelectric microscope presenting: an optical sighting device, means enabling a periodical scanning of the measuring field on either side of a stationary centered position; and a photoelectric cell receiving the rays reflected by the surface of—or transmitted through—the precision ruler and delivering a train of electrical pulses, characterized by the fact that it presents, located on the optical axis of the photoelectric microscope and optically conjugated with the precision ruler, a field diaphragm displacable between two positions corresponding to portions of the measuring field centered on two different strokes of the graduation of the precision ruler.

The attached drawings show schematically and by way of example four embodiments and some variants of the reading device according to the present invention.

In the two embodiments which will be described, the measuring field is lighted in its totality through the optical sighting device of the photoelectric microscope by means of a large pencil of parallel rays, and the scanning is obtained by the periodical displacement of a mask having a slot, situated in a real image plan of the ruler. The slot of this mask or diaphragm periodically displaces from one end to the other of the image of the measuring field and gives passage but to a part of the pencil of parallel rays only corresponding to a portion of the measuring field. This diaphragm thus makes a scanning of the measuring field.

Figure 1:
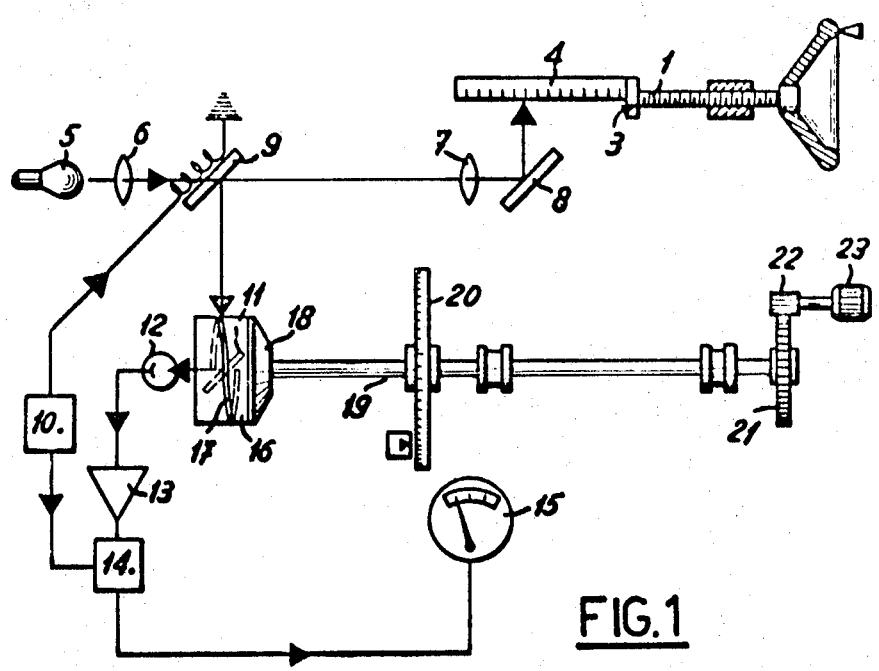
FIG. 1 is a diagram of the first embodiment of the reading device.

FIG. 1 schematically shows a first embodiment of the reading device. This reading device enables the measure and the indication of the position of a movable member with respect to a reference position within the interval comprised between two successive strokes of the graduation of a precision ruler.

In this first embodiment, the machine comprises displacement means, represented by a screw 1, enabling to displace the movable member with respect to a frame. A precision ruler 4 provided with a graduation is fast with this movable member.

This reading device comprises also a photoelectric microscope presenting a luminous source 5, two lenses 6, 7, a fixed mirror 8 reflecting the incident rays towards—and the reflected rays from—the ruler 4. This photoelectric microscope comprises further a second fixed mirror 59 the upper edge of which is located on the axis of the incident pencil so that it deviates only the reflected pencil and lets pass the incident pencil coming from the luminous source 5. The reflected pencil is thus deflected in such a manner as to fall perpendicularly to the cylindrical surface of a field diaphragm 16.

A mirror 11 catches the rays of the reflected pencil passing through the helicoidal slot 17 of the field diaphragm 16 and sends them back onto a photoelectric cell 12. In the example shown, this helicoidal aperture 17 comprises only one turn and has a pitch equal to the interval between two adjacent strokes of the graduation of the ruler 4 multiplied by the optical magnifying of the sighting device, whose magnifying capacity is indicated schematically in the drawing by the magnifying lens 7.

The photoelectric microscope includes a field diaphragm 16. This field diaphragm 16 is carried by a shaft 60 pivoted on the frame of the machine and driven in continuous rotation, at substantially constant speed, by means of a motor 61. The helicoidal slot 17 having one turn causes thus, during the rotation of the field diaphragm 16, the scanning of the image of the ruler projected onto the peripherical surface of the field diaphragm 16. In this manner, the photoelectric cell 12 delivers a pulse each time the angular position of the field diaphragm 16 is such that the image of a stroke of the graduation of the precision ruler 4 coincides with the helicoidal slot 17. These pulses of the photoelectric cell 12 are, after having been amplified in 62 and shaped in 63, delivered to the stopping terminal 64 of a counter 65.

The reading device comprises further a disc 66 fast with the shaft 60. This disc 66 is opaque and comprises on the one hand a window 67 corresponding to a reference position of the shaft 60 and on the other hand located on another radius of the disc 66, a series 68 of ten thousand windows for example uniformly distributed on this periphery.

A first luminous source 69 placed on one side of the disc 66 at a distance from the center of it corresponding to the radius on which the window 67 is disposed lightens a photoelectric cell 70 situated in front of the luminous source 69 but on the other side of the disc 66, when the window 67 is located between this luminous source 69 and this photoelectric cell 70. The pulses emitted by this photoelectric cell 70 are delivered, after amplification in 71 and shaping in 72, to a setting to zero and starting terminal 73 of the counter 65. An inverter 74 enables to permutate the feeding of the terminals 64 and 73 of the counter 65 through the photoelectric cells 12 and 70.

A last, a second luminous source 75, disposed on one side of the disc 66 and in front of the series of windows 68, lights a photoelectric cell 76 disposed on the other side of the disc 66 each time that one of the windows of the series of windows 68 is located between this luminous source 75 and this photoelectric cell 76. The pulses delivered by this photoelectric cell 76 feed, after amplification in 77 and shaping in 78, the counter 65.

The amplifiers 62, 71, 77, 89, 91 are of the type described for example in Electronic Engineering, Feb. 1965, pages 112—114 or in Transistor Circuit Design Texas, page 241, FIG. 18.3., McGraw-Hill, 1963, whereas the shaping circuits 63, 72, 78, 90, 92 are of the type described in Transistor Circuit Design Texas, page 377, FIG. 28.3., or pages 380—381, McGraw-Hill, 1963.

During the rotation of the field diaphragm 16 and thus of the disc 66, the counter 65 is set to zero and started each time it receives a pulse on its terminal 73, that is to say each time that the window 67 is situated between the luminous source 69 and the photoelectric cell 70. From that instant, the counter 65 counts the pulses delivered by the photoelectric cell 76 until the moment where the counter 65 is stopped by a pulse delivered by the photoelectric cell 12.

As the position of the window 67 is such that the photoelectric cells 70 and 12 deliver simultaneously a pulse if the position of the field diaphragm 16 corresponds to the reference position defined by the first embodiment, the number of windows of the series 68, counted between two pulses of the photoelectric cells 70 and 12 corresponds to the spacing between a stroke of the graduation of the ruler and the reference position. Since the counter 65 counts the pulses delivered by the photoelectric cell 76 so that the number indicated by the counter 65, when it is stopped by the pulse coming from the photoelectric cell 12, corresponds to this distance separating the position of the stroke of the reference position.

Further, the counting procedure is repeated at each turn of the disc 66 so that the reading device is recurrent and that it eliminates statistically the errors of counting which may be introduced.

The indication of the counter 65 is thus a measure of the interval separating the position of the stroke from the reference position. The increasing sense of the indication being for example chosen to correspond to a displacement towards the left of the ruler 4, if one desires to display a number corresponding to the increasing indication for a displacement of the ruler 4 towards the right, it suffices to invert with the aid of the inverter 74, the feeding of the terminals 73 and 64 of the counter 65, which enables display of the complementary position figure.

It is evident that the reading device described could be completed by a coarse device indicating for example the position figure in millimeters, the described device acting then as a fine reading device indicating the fractions of millimeters up to the tenth of μm.

In this realization, this embodiment has certain limits. As a matter of fact, the display of the position, that is to say the indication of the counter 65 is practically usable only if the number of windows of the series 68 is relatively low and if the speed of rotation of the shaft 60 is also slow. As a matter of fact, if this would not be the case, the display would be practically unreadable due to its pulsation which would be very rapid and in certain cases the time one has for the setting to zero of the counter would be too small so that the working of this counter would be defective.

To remedy these drawbacks and to enable the described device to have a high definition, which implies a great number of windows of the series 68 as well as a relatively high speed of rotation of the shaft 60, one may, in a variant, use a display device such as the one described in the U.S. Pat. No. 3,346,848 (U.S. Pat. application No. 467,032 filed in the name of Societe Genevoise d'Instruments de Physique on the 25th June, 1965) and illustrated particularly at FIG. 1 of this patent.

Figure 3:
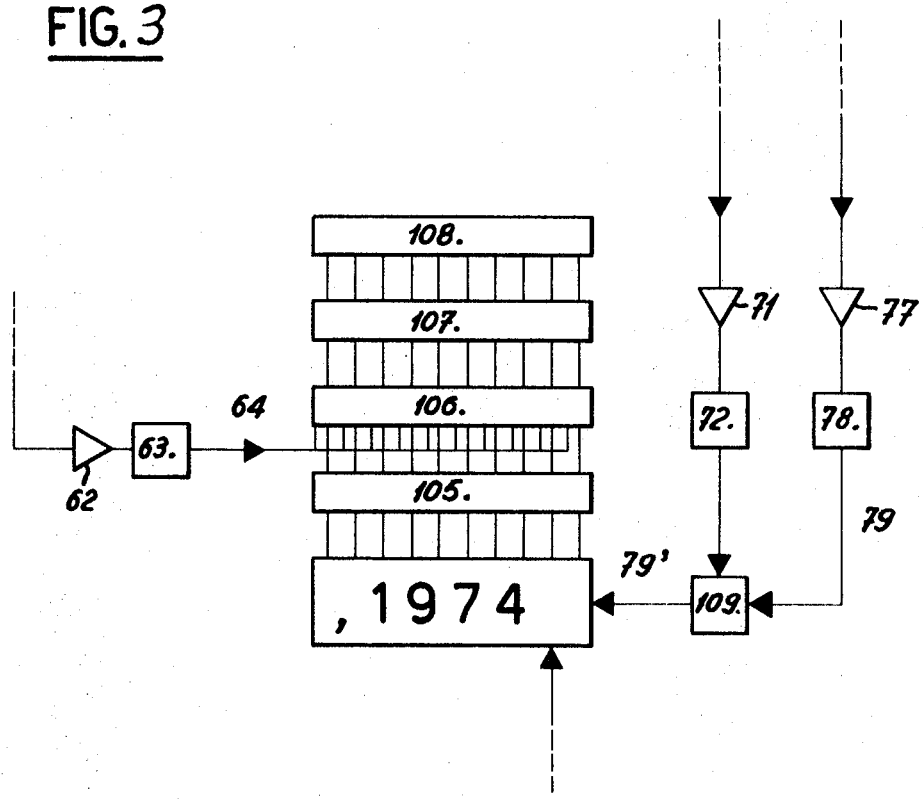
FIGS. 3 and 4 show two block diagrams of display devices which may be used in relation with the reading device.

FIG. 3 shows in which manner the display described in this precited patent may be without difficulty adapted and connected to the counter 65 of the described device. This display device comprises pulse-forming circuits 105 and two groups of AND circuits 106 and 107 connected in cascade as well as a group of display elements 108. There is further a control circuit 109 of the counter 65 constituted by an electronic commutator constituted by a bistable multivibrator ("Transistor Circuit Design" by J. A. Walston, J.R. Muller, J. R. Instruments Inc., McGraw-Hill Editor, 1963, pages 373—377 "Bistable Multivibrator").

Figure 4:
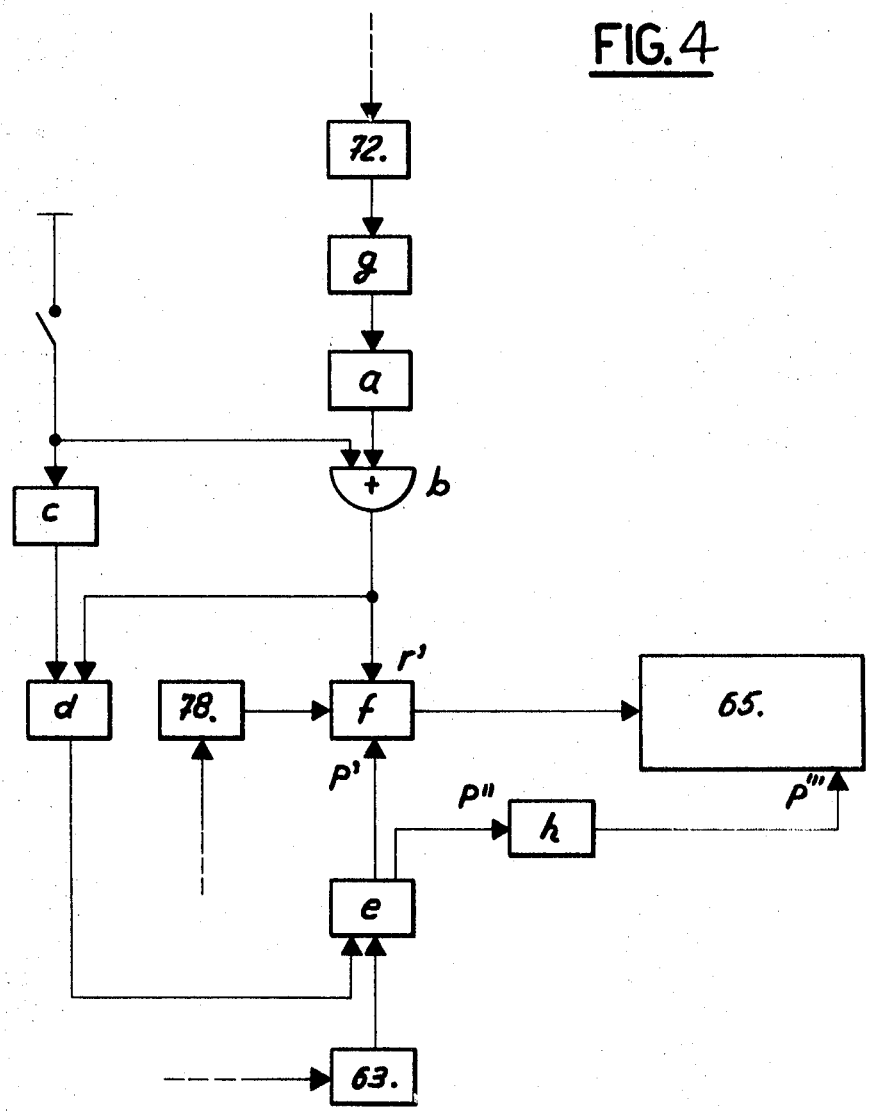
Figure 1:
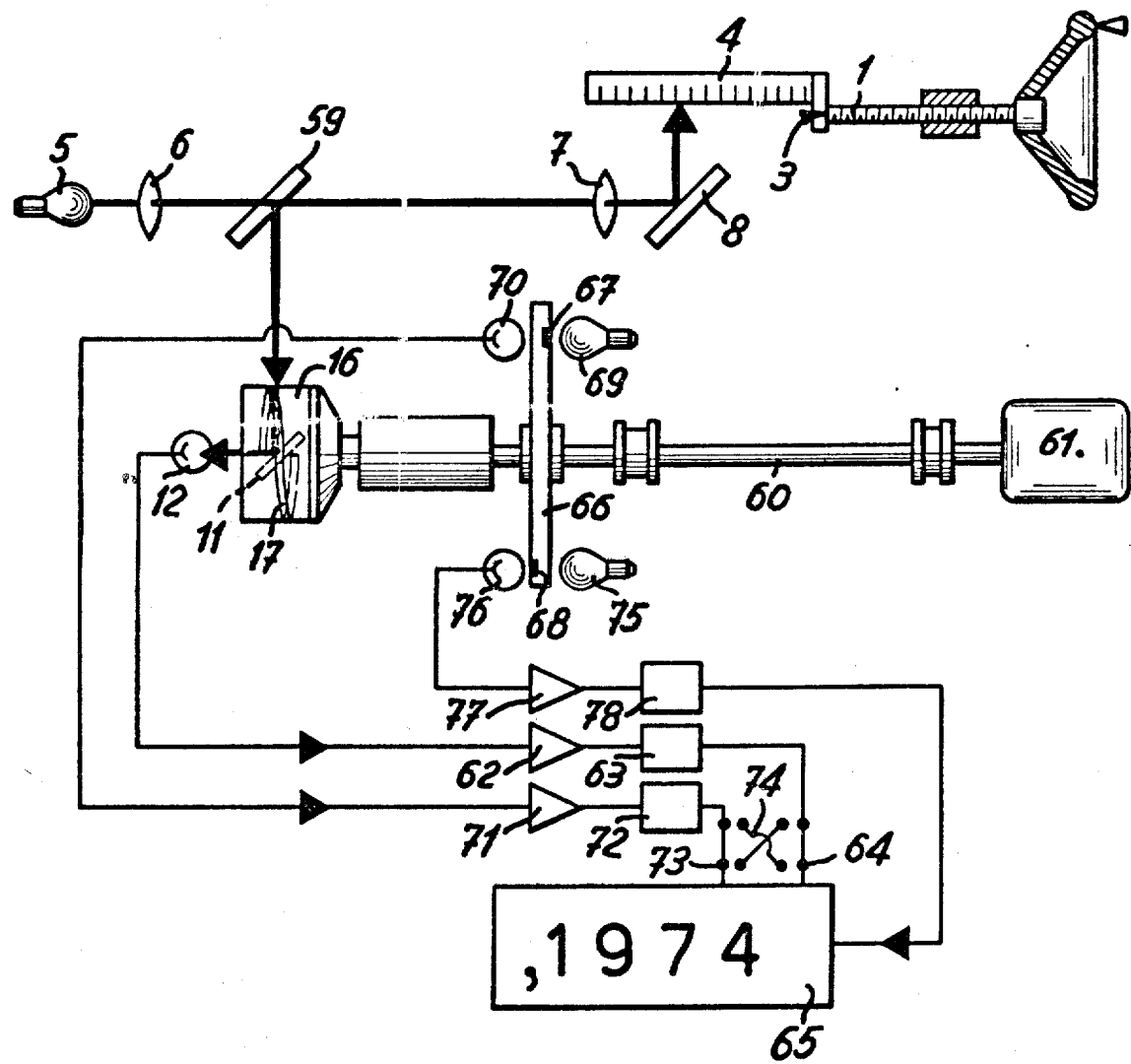

Another variant permitting also to obviate the precited drawbacks will be described herebelow. This second variant describes a display, the aim of which is to obtain for all ciphers which are displayed a display time having a same duration and which can thus be read easily (FIG. 4). Tests have been made in laboratory and have shown that for a graduated disc revolving at 3,000 turns per minute the best display was obtained when this display was made during each second revolution of the disc, that is to say during one revolution out of two.

In this display device, the display member has alternatively an "active" and an "inactive" period. These two periods are of an equal duration. Thus, for a disc revolving set the counter 65 to zero after having been formed in $h$.

The display member has an "active" period during the time between two pulses P' and P''' and an "inactive" period during the time between the pulses P''' and P', these two periods being of equal duration. The display is made each second revolution of the disc, the pulses delivered by the photoelectric cells 70 and 12 being divided by two by means of the binary stages $g$ and $e$.

Figure 2:
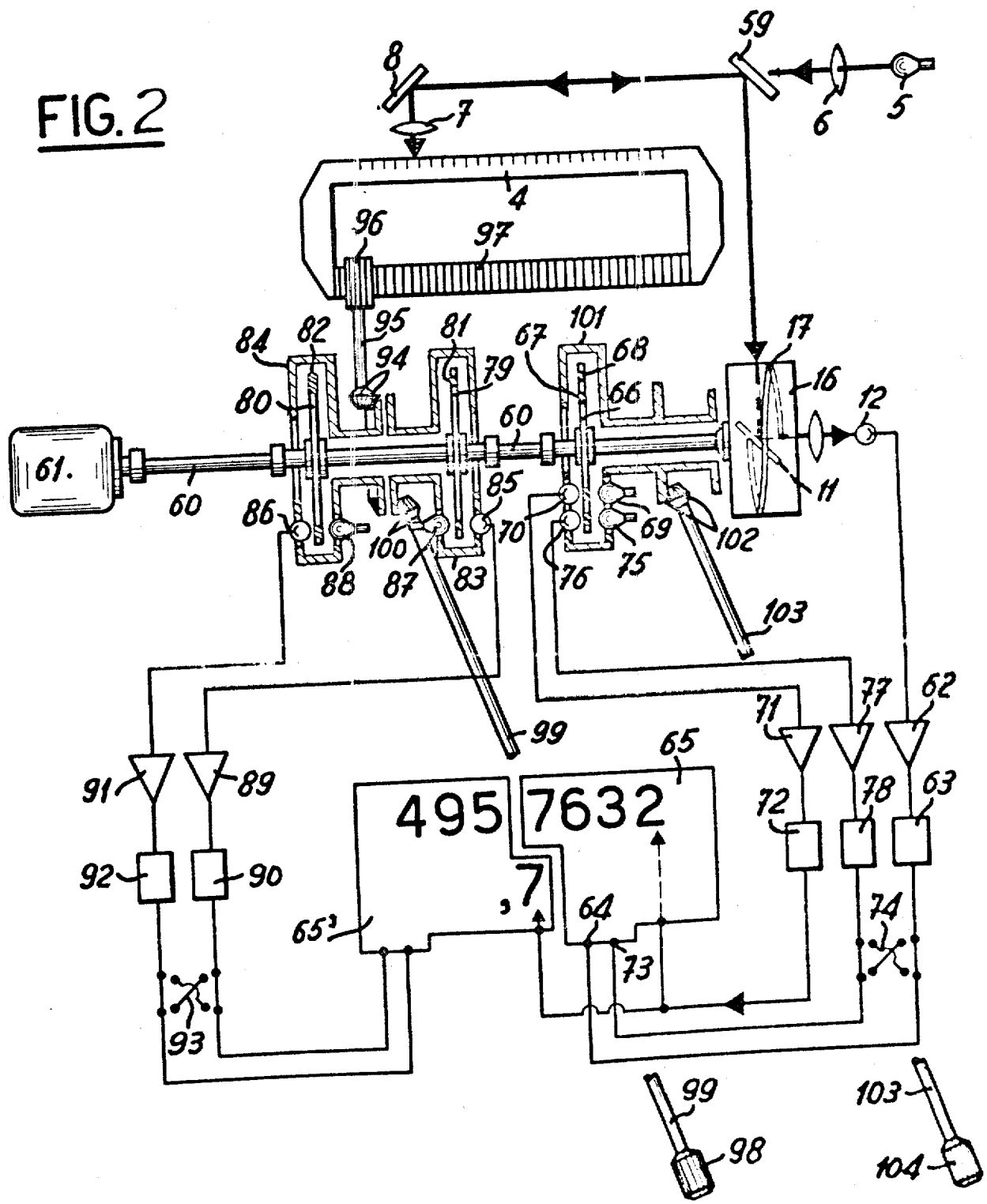
FIG. 2 is a diagram of the second embodiment of the reading device.
Figure 3:
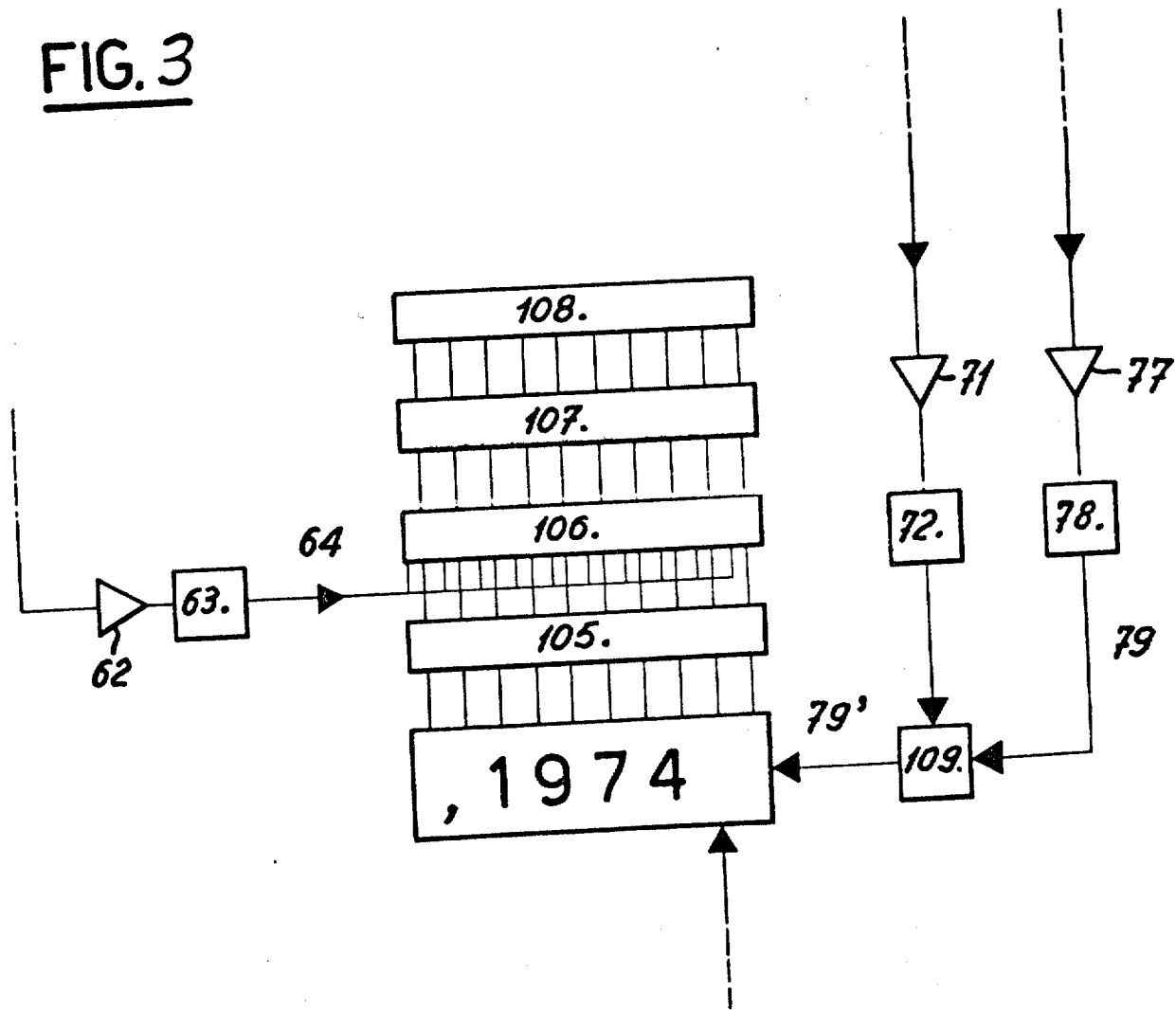
Figure 4:
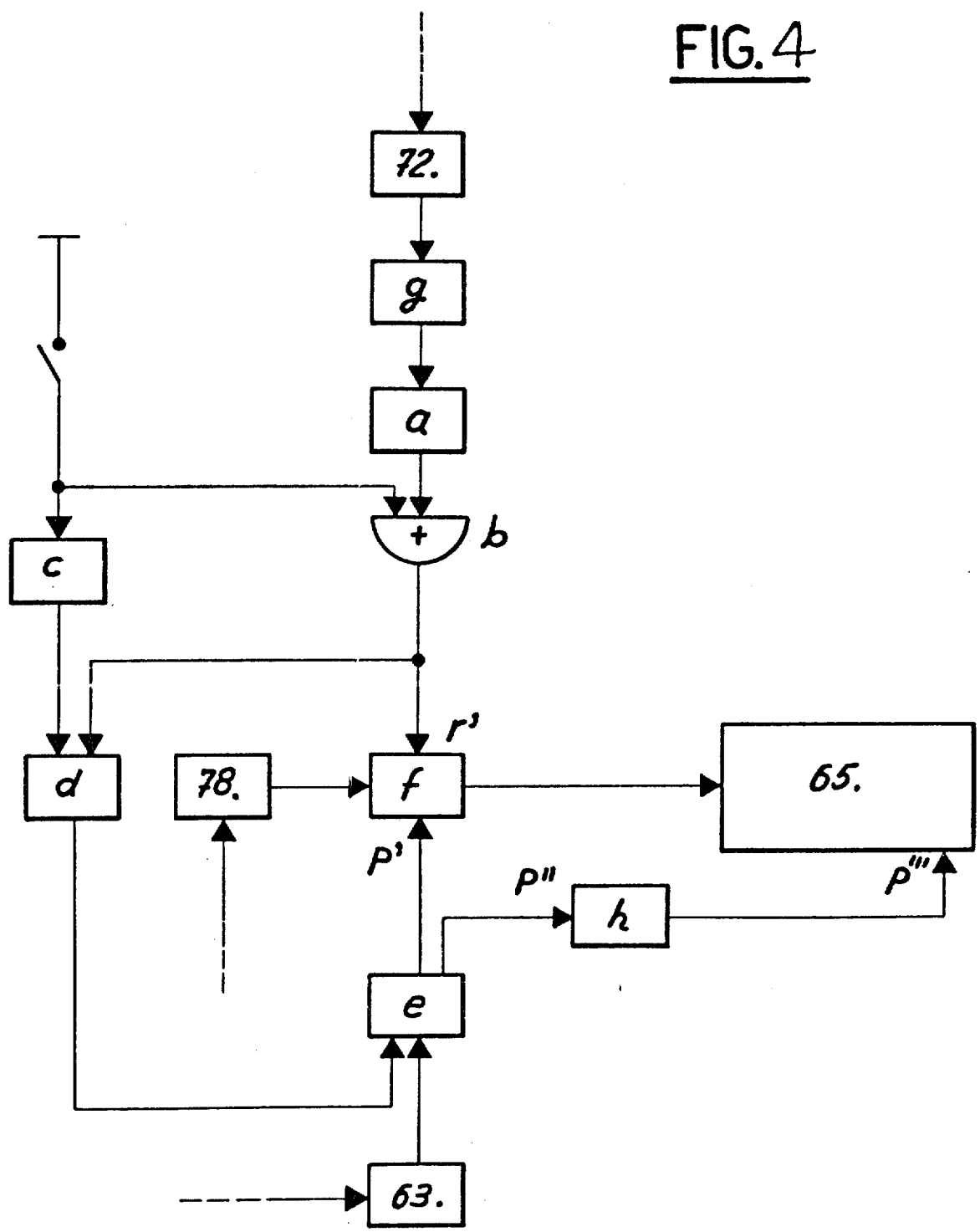

The second embodiment shown at FIG. 2 represents a reading device comprising a coarse reading device and a fine reading device.

In this later embodiment, the photoelectric microscope as well as the fine reading device are identical to the ones of the first embodiment.

Further, the reading device of this second embodiment comprises a coarse reading device as well as setting to zero devices of the coarse reading device and of the fine reading device.

The coarse reading device comprises two discs 79, 80 fast with the shaft 60 and comprising each an opaque annular zone 81, 82 respectively, comprising a window. Each of these discs 79, 80 is located within a housing 83, 84 respectively pivoted around the shaft 60 and carrying a photoelectric cell 85, 86 and a luminous source 87, 88 disposed on either side of the said corresponding opaque annular zone 81, 82.

The photoelectric cell 85 delivers, after amplification in 89 and shaping in 90, a setting to zero and starting pulse of a coarse counter 65', whereas the photoelectric cell 86 delivers, after amplification in 91 and shaping in 92, a stopping pulse to the coarse counter 65'. An inverter 93 a 3,000 turns per minute and a display occurring every second revolution of the disc, one has an "active" period of 20 msec. and an "inactive" period of also 20 msec. This causes a slight scintillation which does not affect the reading.

This display is realized by means of known electronic circuits which will not be described in detail. This display circuit comprises:

1. An initial starting circuit comprising a pulses-forming circuit $a$, a logic circuit AND $b$, a pulses-forming circuit $c$ and a bistable multivibrator $d$. This circuit guarantees a correct recurrence of the display as soon as it is started by setting the binary stage $e$ in a predetermined state.
2. An electronic gate $f$ controlled on the one hand by the pulses delivered by the photoelectric cell 70 and on the other hand by the pulses corresponding to the actual position, delivered by the photoelectric cell 12.
3. Two binary stages $g$, $e$ dividing respectively by two the pulses of the photoelectric cell 70 of the actual positions pulses delivered by the photoelectric cell 12. and
4. A pulse-forming circuit $h$ gives the pulses P''' to enable the setting to zero of the counter 65. The working of this display device is the following: The starting pulses $r'$ delivered by the photoelectric cell 70 open the electronic gate $f$ which passes the pulses delivered by the photoelectric cell 76 in the counter 65. The pulses P' lock the gate $f$ and stop therefore the counting in the counter 65. The pulses P'' (complementary pulses of P') enables permutate the photoelectric cells 85, 86 when it is desired to obtain the display of the complementary figure or when the movable member, that is to say the ruler, is displaced in a reverse direction.

Further, the coarse counter 65' is also fed by the pulses train delivered by the photoelectric cell 70 of the fine reading device.

The housing 84 surrounding the disc 80 is mechanically coupled by means of a conical gear 94 of an axis 95 and of a pinion 96 to a rack 97 fast with the precision ruler 4. The angular position of the housing 84 depends thus on the linear position of the movable member.

Finally, the setting to zero device of the coarse reading device comprises a gripping member 98 driving a rod 99 in rotation which is connected by means of a gearing 100 to the housing 83. In this manner, through rotation of the gripping member 98, one obtains an angular displacement of the housing 83 and thus of the luminous source 87 and of the photoelectric cell 85 with respect to the disc 79. This setting to zero device of the fine reading device is similar, the luminous sources 69 and 75 as well as the photoelectric cells 70 and 76 being mounted on a housing 101 pivoted on the shaft 60 and connected by means of a gearing 102 and a rod 103 to a gripping member 104.

The operation of this second embodiment is as follows:

When the housings 83 and 101 have been placed by means of the gripping members 98 and 104 in the reference position which is wanted, the working of the fine reading device is identical to the one of the device described in reference to FIG. 1. The counter 65 displays in ten thousands parts of the interval separating two adjacent strokes of the graduation of the ruler 4, the distance between the position of the stroke of this ruler and the reference position which may be immediately to the right or to the left of this point according to the position of the inverter 74.

Due to the driving in rotation of the housing 84 through the rack 97, the distance between the moment of the passage of the unique window of the disc 79 and that of the disc 80 corresponds to the linear displacement of the rack, thus of the ruler 4, out of its reference position. The pulse due to the window of the disc 79 sets to zero and starts the counter 65', whereas the pulse due to the window of the disc 80 stops the counter 65'. This counter is fed during its working time by the pulse train emitted by the windows uniformly distributed on the disc 66 so that the counter 65' displays the position of said disc with respect to its origin, determined by the reference position and thus by the position of the housing 83.

In the example shown, the first decade of the fine counter 65 has the same signification as the last decade (not displayed) of the coarse counter 65', and to avoid any ambiguity, the first decade of the fine counter 65 pilots in known manner the nondisplayed decade of the coarse counter 65'.

In that way, if one has ten thousand windows equally spaced on the disc 66, one obtains an indication of the tenth of micron over a total stroke of one meter.

In this embodiment also, the reading device is recurrent and the counting is started again for each turn of the shaft 60 so that any counting error is statistically eliminated. Here also one could provide the counters 65 and 65' with a display device such as the one described in the U.S. Pat. No. 3,042,804.

In a variant, the windows 81 and 82 could be carried by the same disc and the groups of cells and luminous source 85, 87, 86, 88 carried by a same housing. This sole housing would be mechanically connected to the gripping member 98 by a gearing 100 and simultaneously to the rack 97 by a gearing 94, the axis 95 and the pinion 96. However, one has to provide in this latter kinematic linkage a friction coupling so as to be able to displace angularly the sole housing by means of the gripping member 98 without affecting the position of the rack 97.

It is evident that in all these described embodiments the position of the photoelectric cells may always be changed with the one of the corresponding luminous sources and that the rulers could be transparent and lightened in diascopy.

The number of divisions of the counting disc or discs may be chosen at will. For a same precision of the reading device, this number may be reduced by using two generators, (luminous source and photoelectric cell) disposed in such a way that the two electrical currents which are approximately sinusoidal delivered by the two generators be 90° out of phase.

The number of turns of the helix 17 of the field diaphragm is always at least equal to one, but may be greater.

The strokes of the graduation of the precision ruler could be inclined so that their image reproduced on the periphery of the field diaphragm be parallel to the axis of the helicoidal slot at this point of the field diaphragm. In another variant, the inclination of the image of the strokes could be obtained by optical means.

In other variants, the helicoidal slot 17 could be reflecting as well as the strokes of the precision ruler 4. In this case, one would have to provide between the deflector 9 or the mirror 59 and the field diaphragm a separator enabling to send back the reflected rays by the brilliant slot on the photoelectric cell 12.

The generators constituted by the discs 66, 79 and 80 as well as by their housing, luminous source and associated photoelectric cell, could be differently constituted as long as they permit the generation of the necessary pulses. These generators could for example be electromagnetic, electrostatic, electromechanic, optical and so on.

I claim:

1. A high-precision reading device of the graduation marks of a precision scale comprising a photoelectric microscope having an optical sighting unit, means for periodically scanning a measuring field of the scale on either side of a fixed centered position, a photoelectric cell receiving light rays from the scale by way of said scanning means and delivering a train of electrical pulses, said scanning means comprising a diaphragm having an opening therein disposed in the optical path of the photoelectric microscope and in a conjugated plane of the scale, said diaphragm comprising a cylindrical member having a helicoidal slot therein disposed in at least one complete turn about the cylindrical member, the pitch of the helicoidal slot being equal to the interval comprised between two graduation marks of the scale multiplied by the optical magnification of the optical sighting device of the photoelectric microscope, means to rotate the cylindrical member about its axis to move said slot between positions corresponding to portions of the measuring field between different graduation marks on the scale, said rotating means comprising a motor that rotates the cylindrical member continuously so that the scanning of the measuring field is obtained by the periodical passage of the slot in front of the image of the whole measuring field, and means rotatable with the cylindrical member to provide an optical signal indicative of a portion of said interval between said two graduation marks.

2. A reading device as claimed in claim 1, said rotating means including a shaft which carries the diaphragm and which carries also at least one disc having angularly spaced means thereon corresponding to subdivisions between said graduation marks of said scale, said disc comprising a portion of a generator delivering a pulse when each said means on the disc passes before a reference position.

3. A reading device as claimed in claim 1, and a reversible counter fed by said pulse train.

4. A reading device as claimed in claim 3, said counter being recurrent.

UNITED STATES PATENT OFFICE
CERTIFICATE OF CORRECTION

Patent No. 3,590,260            Dated June 29, 1971

Inventor(s)   Peter Holmes et al.

It is certified that error appears in the above-identified patent and that said Letters Patent are hereby corrected as shown below:

Cancel the drawings and substitute the attached sheets. The illustrative drawing on the cover sheet should appear as Fig. 1. Columns 3 and 4 should be cancelled and the attached substituted therefor.

Signed and sealed this 27th day of November 1973.

(SEAL)
Attest:

EDWARD M. FLETCHER, JR.          RENE D. TEGTMEYER
Attesting Officer                 Acting Commissioner of Patents During the rotation of the field diaphragm 16 and thus of the disc 66, the counter 65 is set to zero and started each time it receives a pulse on its terminal 73, that is to say each time that the window 67 is situated between the luminous source 69 and the photoelectric cell 70. From that instant, the counter 65 counts the pulses delivered by the photoelectric cell 76 until the moment where the counter 65 is stopped by a pulse delivered by the photoelectric cell 12.

As the position of the window 67 is such that the photoelectric cells 70 and 12 deliver simultaneously a pulse if the position of the field diaphragm 16 corresponds to the reference position defined by the first embodiment, the number of windows of the series 68, counted between two pulses of the photoelectric cells 70 and 12 corresponds to the spacing between a stroke of the graduation of the ruler and the reference position. Since the counter 65 counts the pulses delivered by the photoelectric cell 76 so that the number indicated by the counter 65, when it is stopped by the pulse coming from the photoelectric cell 12, corresponds to this distance separating the position of the stroke of the reference position.

Further, the counting procedure is repeated at each turn of the disc 66 so that the reading device is recurrent and that it eliminates statistically the errors of counting which may be introduced.

The indication of the counter 65 is thus a measure of the interval separating the position of the stroke from the reference position. The increasing sense of the indication being for example chosen to correspond to a displacement towards the left of the ruler 4, if one desires to display a number corresponding to the increasing indication for a displacement of the ruler 4 towards the right, it suffices to invert with the aid of the inverter 74, the feeding of the terminals 73 and 64 of the counter 65, which enables display of the complementary position figure.

It is evident that the reading device described could be completed by a coarse device indicating for example the position figure in millimeters, the described device acting then as a fine reading device indicating the fractions of millimeters up to the tenth of $\mu$m.

In this realization, this embodiment has certain limits. As a matter of fact, the display of the position, that is to say the indication of the counter 65 is practically usable only if the number of windows of the series 68 is relatively low and if the speed of rotation of the shaft 60 is also slow. As a matter of fact, if this would not be the case, the display would be practically unreadable due to its pulsation which would be very rapid and in certain cases the time one has for the setting to zero of the counter would be too small so that the working of this counter would be defective.

To remedy these drawbacks and to enable the described device to have a high definition, which implies a great number of windows of the series 68 as well as a relatively high speed of rotation of the shaft 60, one may, in a variant, use a display device such as the one described in the U.S. Pat. No. 3,346,-848 (U.S. Pat. application No. 467,032 filed in the name of Societe Genevoise d'Instruments de Physique on the 25th June, 1965) and illustrated particularly at FIG. 1 of this patent.

FIG. 3 shows in which manner the display described in this precited patent may be without difficulty adapted and connected to the counter 65 of the described device. This display device comprises pulse-forming circuits 105 and two groups of AND circuits 106 and 107 connected in cascade as well as a group of display elements 108. There is further a control circuit 109 of the counter 65 constituted by an electronic commutator constituted by a bistable multivibrator ("Transistor Circuit Design" by J. A. Walston, J. R. Muller, J. R. Instruments Inc., McGraw-Hill Editor, 1963, pages 373-377 "Bistable Multivibrator").

Another variant permitting also to obviate the precited drawbacks will be described herebelow. This second variant describes a display, the aim of which is to obtain for all ciphers which are displayed a display time having a same duration and which can thus be read easily (FIG. 4). Tests have been made in laboratory and have shown that for a graduated disc revolving at 3,000 turns per minute the best display was obtained when this display was made during each second revolution of the disc, that is to say during one revolution out of two.

In this display device, the display member has alternatively an "active" and an "inactive" period. These two periods are of an equal duration. Thus, for a disc revolving at 3,000 turns per minute and a display occurring every second revolution of the disc, one has an "active" period of 20 msec. and an "inactive" period of also 20 msec. This causes a slight scintillation which does not affect the reading.

This display is realized by means of known electronic circuits which will not be described in detail. This display circuit comprises:

1. An initial starting circuit comprising a pulses-forming circuit $a$, a logic circuit AND $b$, a pulses-forming circuit $c$ and a bistable multivibrator $d$. This circuit guarantees a correct recurrence of the display as soon as it is started by setting the binary stage $e$ in a predetermined state.
2. An electronic gate $f$ controlled on the one hand by the pulses delivered by the photoelectric cell 70 and on the other hand by the pulses corresponding to the actual position, delivered by the photoelectric cell 12.
3. Two binary stages $g$, $e$ dividing respectively by two the pulses of the photoelectric cell 70 of the actual positions pulses delivered by the photoelectric cell 12, and
4. A pulse-forming circuit $h$ gives the pulses P''' to enable the setting to zero of the counter 65. The working of this display device is the following: The starting pulses $r'$ delivered by the photoelectric cell 70 open the electronic gate $f$ which passes the pulses delivered by the photoelectric cell 76 in the counter 65. The pulses P' lock the gate $f$ and stop therefore the counting in the counter 65. The pulses P'' (complementary pulses of P') set the counter 65 to zero after having been formed in $h$.

The display member has an "active" period during the time between two pulses P' and P''' and an "inactive" period during the time between the pulses P''' and P', these two periods being of equal duration. The display is made each second revolution of the disc, the pulses delivered by the photoelectric cells 70 and 12 being divided by two by means of the binary stages $g$ and $e$.

The second embodiment shown at FIG. 2 represents a reading device comprising a coarse reading device and a fine reading device.

In this later embodiment, the photoelectric microscope as well as the fine reading device are identical to the ones of the first embodiment.

Further, the reading device of this second embodiment comprises a coarse reading device as well as setting to zero devices of the coarse reading device and of the fine reading device.

The coarse reading device comprises two discs 79, 80 fast with the shaft 60 and comprising each an opaque annular zone 81, 82 respectively, comprising a window. Each of these discs 79, 80 is located within a housing 83, 84 respectively pivoted around the shaft 60 and carrying a photoelectric cell 85, 86 and a luminous source 87, 88 disposed on either side of the said corresponding opaque annular zone 81, 82.

The photoelectric cell 85 delivers, after amplification in 89 and shaping in 90, a setting to zero and starting pulse of a coarse counter 65', whereas the photoelectric cell 86 delivers, after amplification in 91 and shaping in 92, a stopping pulse to the coarse counter 65'. An inverter 93 enables to permutate the photoelectric cells 85, 86 when it is desired to obtain the display of the complementary figure or when the movable member, that is to say the ruler, is displaced in a reverse direction.

Further, the coarse counter 65' is also fed by the pulses train delivered by the photoelectric cell 70 of the fine reading device.